United States Patent
Bolyard, Jr.

(10) Patent No.: US 9,600,848 B2
(45) Date of Patent: Mar. 21, 2017

(54) METHOD FOR A CENTRALIZED OBITUARY SERVICE

(71) Applicant: David W Bolyard, Jr., Newburg, WV (US)

(72) Inventor: David W Bolyard, Jr., Newburg, WV (US)

( * ) Notice: Subject to any disclaimer, the term of this patent is extended or adjusted under 35 U.S.C. 154(b) by 0 days.

(21) Appl. No.: 15/185,940

(22) Filed: Jun. 17, 2016

(65) Prior Publication Data

US 2016/0371797 A1    Dec. 22, 2016

Related U.S. Application Data

(60) Provisional application No. 62/181,163, filed on Jun. 17, 2015.

(51) Int. Cl.
*G06F 17/30* (2006.01)
*G06Q 50/10* (2012.01)

(52) U.S. Cl.
CPC ....... *G06Q 50/10* (2013.01); *G06F 17/30011* (2013.01); *G06F 17/3087* (2013.01); *G06F 17/3089* (2013.01); *G06F 17/30867* (2013.01)

(58) Field of Classification Search
None
See application file for complete search history.

(56) References Cited

U.S. PATENT DOCUMENTS

| | | | | |
|---|---|---|---|---|
| 5,651,117 A * | 7/1997 | Arbuckle | ............... | G06Q 30/06 705/3 |
| 2005/0060166 A1* | 3/2005 | Durham | ................. | G06Q 30/02 705/1.1 |
| 2008/0005666 A1* | 1/2008 | Sefton | .................... | G06Q 99/00 715/234 |
| 2010/0008076 A1* | 1/2010 | Elam | ..................... | E04H 13/003 362/183 |
| 2014/0136996 A1* | 5/2014 | Boozer | .................. | G06Q 10/00 715/753 |
| 2015/0046543 A1* | 2/2015 | Childress | ............... | H04L 67/22 709/206 |

(Continued)

FOREIGN PATENT DOCUMENTS

EP  2750358    * 12/2014
WO  WO2014102163    * 7/2014

*Primary Examiner* — Hung Le

(57) ABSTRACT

A centralized obituary service that effectively and efficiently distributes death notices, obituaries, to the general public. The service utilizes a user location for a user account in order to display obituaries from a plurality of obituaries to the user account. More specifically, the user location is compared to biographical information of each of the obituaries in order to identify location-related obituaries. Said location-related obituaries are then displayed with a user personal computing (PC) device. Next, the service prompts the user account to enter a search query request through the user PC device, wherein the search query request includes a set of biographical criteria. A set of biographically matching obituaries are then identified by a remote server. The biographical information for each within the set of biographically matching obituaries meets at least one of the biographical criteria. Finally, the set of biographically-matching obituaries is displayed by the user PC device.

7 Claims, 8 Drawing Sheets

(56) References Cited

U.S. PATENT DOCUMENTS

2016/0110394 A1* 4/2016 Boxwell ............... G06Q 50/01
 707/741
2016/0171556 A1* 6/2016 Grewe ............... G06Q 30/0269
 705/14.66

* cited by examiner

METHOD FOR A CENTRALIZED OBITUARY SERVICE

The current application claims a priority to the U.S. Provisional Patent application Ser. No. 62/181,163 filed on Jun. 17, 2015.

FIELD OF THE INVENTION

The present invention relates generally to generally to a method and system for distributing and informing the general public of death notices, obituaries. More specifically, the present invention is a method for efficiently providing up-to-date obituaries for the general public, in particular people that are or may be related/connected to the deceased.

BACKGROUND OF THE INVENTION

Obituaries have been written since the $18^{th}$ century to report a recent death of a person. Obituaries are often written by family members or friends as a memorial, notifying people of the death, along with an account of the person's life and information about the upcoming funeral. Obituaries are typically published in newspapers and paid for by the family of the deceased. Publishing an obituary in a newspaper can be very costly, typically averaging between $250-500, with some costing upwards of a 1000$. People are often charged to post the obituary, charged to buy the newspaper and charged to read it online, with the newspaper reaping all the benefits for publishing a simple article. Families frequently elect not to run an obituary or are required to shorten the length due to costs. Additionally, newspaper obituaries are not up-to-date, meaning it may take a few days or up to a week for someone to show up in an obituary after their death. Another problem with newspaper obituaries is that the number of readers is decreasing every year, while the costs are increasing. The present invention addresses this problem and provides a cheaper and up-to-date obituary service for people all across the world.

Another problem with the current system of death notices is that they are very territorial. Publishing an obituary in a local newspaper only notifies people within that specific area, therefore family and friends not within that area will not know that a loved one has passed. Additionally, a large number of areas do not have a daily newspaper. The present invention provides a more widespread obituary service that notifies the people connected to the deceased, whether it be friends, family or simply an acquaintance no matter their location. The present invention is a central site comprising a database of authentic and up-to-date obituaries which displays said obituaries based on the location of the viewer or the preferences entered by the viewer. Additionally, the present invention also utilizes a notification system that notifies users of obituaries that meet a set of pre-configured criteria, such as a last name or a specific location.

Current websites and methods that aim to accomplish similar objectives as the present invention fall short in various ways. First, these sites rely on obtaining obituaries from external sources such as newspapers. Individuals are still required to pay the absurd prices newspapers charge in order to publish an obituary. Although there are options that allow an individual to post an obituary onto the site for a flat fee, there are problems associated with this method. A problem with this is that premature obituaries may be posted, or a false report of a death. The present invention is connected directly with funeral home directors in order to reduce any chances of a premature obituary being posted. Additionally, the present invention is purely based on the information provided by funeral homes and not newspapers. This is essentially a network for funeral home directors to post obituaries that are uploaded immediately, reducing costs for families and distributes the profits among the funeral home directors which are currently being hoarded by newspaper companies. In another embodiment of the present invention, the same method and system may be applied to births. Rather than funeral homes posting death notices, hospitals will be able to post birth notices, utilizing the same implementation mentioned above.

DETAIL DESCRIPTIONS OF THE INVENTION

Figure 1:
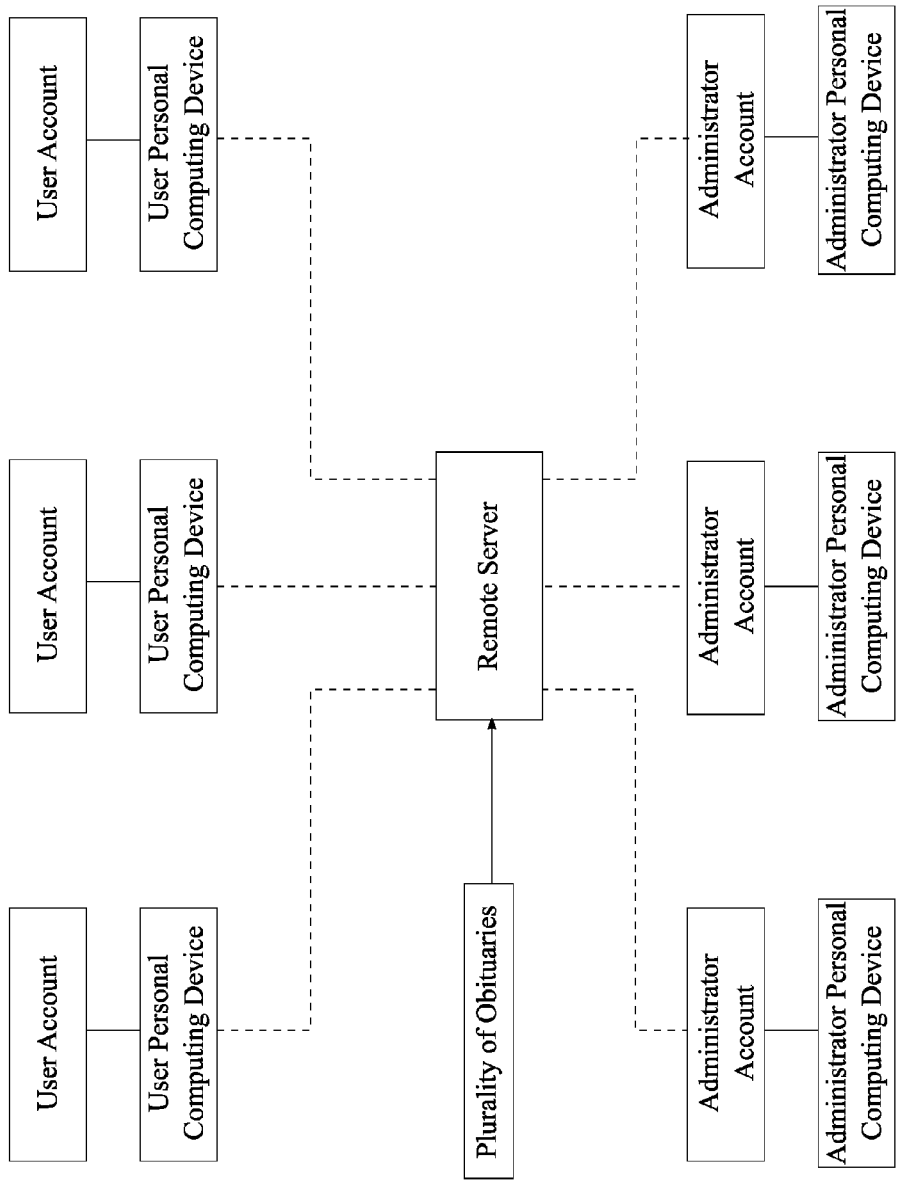
FIG. 1 is a schematic view of the present invention.

All illustrations of the drawings are for the purpose of describing selected versions of the present invention and are not intended to limit the scope of the present invention.

The present invention is a system and method for efficiently informing the general public of death notices, obituaries. More specifically, the present invention receives obituaries from authorized entities and distributes said information to the general public through a centralized website or software application. The present invention is designed to receive death notices from funeral home directors in order to prevent premature obituaries, lower costs, and save time/energy for grieving families. The present invention hosts a website that allows any individual or user to search and view obituaries based on his/her personal location or based on his/her search preferences. As a result, the present invention allows families to post obituaries in multiple areas for one flat fee.

The present invention comprises a system and a method that provide a novel centralized obituary service. The method is a software application executed by the system of the present invention for an at least one user account and a plurality of administrator accounts. The user account represents any individual that is accessing the present invention in order to search through and view any of a plurality of obituaries. The user account may access the present invention through a user personal computing (PC) device. Each of the administrator accounts represents a funeral home that is registered and participating with the present invention. Similar to the user account, each of the administrator account may access the present invention through a corresponding administrator PC device. Types of devices that may be used as the user PC device and the administrator PC device include, but are not limited to, smartphones, desktops, laptops, tablets, and any other device with Internet capabilities. The user account and the plurality of administrator account are managed by an at least one remote server; wherein the user account is associated with a user location and each of the administrator account is associated with a funeral-home location (Step A). The user location is a geospatial location of the individual associated with the user account. Similarly, the funeral-home location is the geospatial location of the funeral home associated with the corresponding administrator account.

Through the remote server the present invention manages the plurality of obituaries, wherein each of the obituaries includes biographical information (Step B). Biographical information includes, but is not limited to, first name, last name, family origin, place of birth, career history, living or deceased relatives, age, place of residency, special messages, and other information that traditionally is included in an obituary. One of the advantages of the present invention is that there is no limit to length, size, or content included in each of the obituaries. Families are free to include as much information as they please including photos, videos, and text relating to the deceased individual. The system of the present invention comprises the physical components necessary to execute the method of the present invention. Components include, but are not limited to, the remote server, the user PC device, and the administrator PC device.

Figure 2:
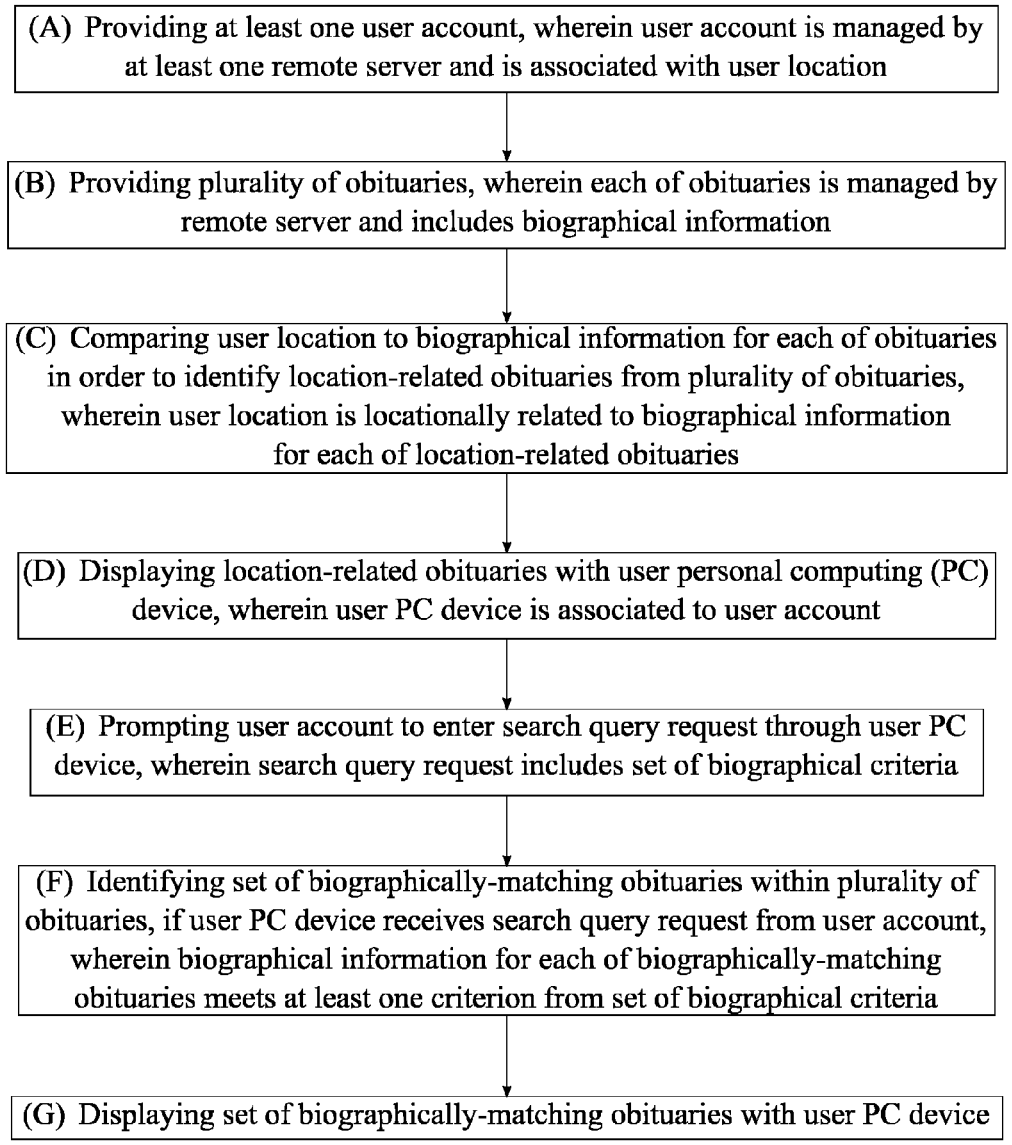
FIG. 2 is a flowchart depicting the overall process of the present invention.

Referring to FIG. 2, the overall process of the present invention is disclosed in relation to a single individual, the user account, as the process is the same for any individual and user account. The overall process begins once the user account accesses the present invention through the user PC device. First, the present invention displays all of the obituaries that are within the vicinity of the user account and all of the obituaries which contain references to the user location. This is accomplished by comparing the user location to the biographical information for each of the obituaries in order to identify location-related obituaries from the plurality of obituaries (Step C). The location-related obituaries are obituaries from the plurality of obituaries that are either near the user location or contain references to the user location. In other words, the user location is locationally related to the biographical information for each of the location-related obituaries. Once identified, the location-related obituaries are then displayed to the user account with the user PC device (Step D). It is preferred that the location-related obituaries are ordered based on proximity, ranging from closest to furthest. Although, in alternative embodiments, the user account may change the display and order settings. For example, the user account may choose to view the location-related obituaries in an alphabetic order.

Continuing the overall process, the user account is then prompted to enter a search query request through the user PC device (Step E); this option is continuously displayed on the user PC device. The search query request includes a set of biographical criteria that outline the type of obituaries the user account is looking for. Three of the main biographical criteria are city/state of the deceased, first name, and last name. A variety of additional biographical criteria may also be available to the user account including, but not limited to, age, race, sex, zipcode, high school name, and other relevant information. If the user PC device receives the search query request from the user account, then the present invention identifies a set of biographically-matching obituaries within the plurality of obituaries (Step F). In particular, each of the biographically-matching obituaries contain biographical information that meet at least one criterion from the set of biographical criteria. The set of biographically matching obituaries are then displayed by the user PC device (Step G). The set of matching obituaries is preferably ordered from most similar to least similar in relation to the set of biographical criteria.

Figure 3:
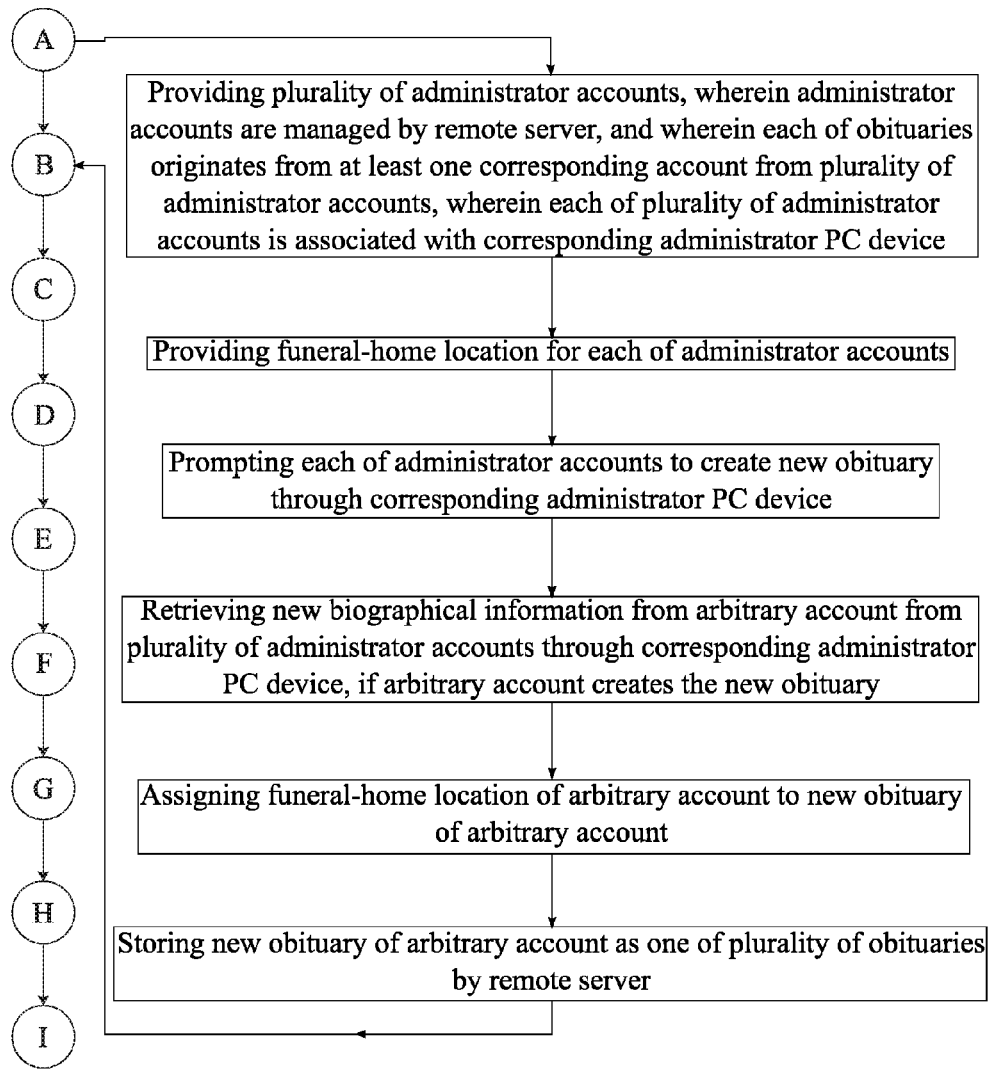
FIG. 3 is a flowchart depicting the steps necessary to add a new obituary to the plurality of obituaries.

The present invention receives obituaries from funeral homes directly in order to increase the convenience for the grieving family and to ensure the authenticity of each of the obituaries. As a result, each of the obituaries originates from at least one corresponding account from the plurality of administrator accounts. Referring to FIG. 3, the process for receiving obituaries begins with the present invention prompting each of the administrator accounts to create a new obituary through the corresponding administrator PC device. In other words, this option is consistently offered to each of the administrator accounts. If an arbitrary account creates the new obituary, then new biographical information is retrieved from the arbitrary account through the corresponding administrator PC device. The arbitrary account represents any one of the plurality of administrator accounts. Next, the new obituary of the arbitrary account is stored as one of the plurality of obituaries by the remote server and is instantly available for viewing for the user account. The new obituary, or any within the plurality of obituaries, may be altered anytime after storing. This may involve the funeral home reviewing any changes prior to updating the obituary in question.

Figure 4:
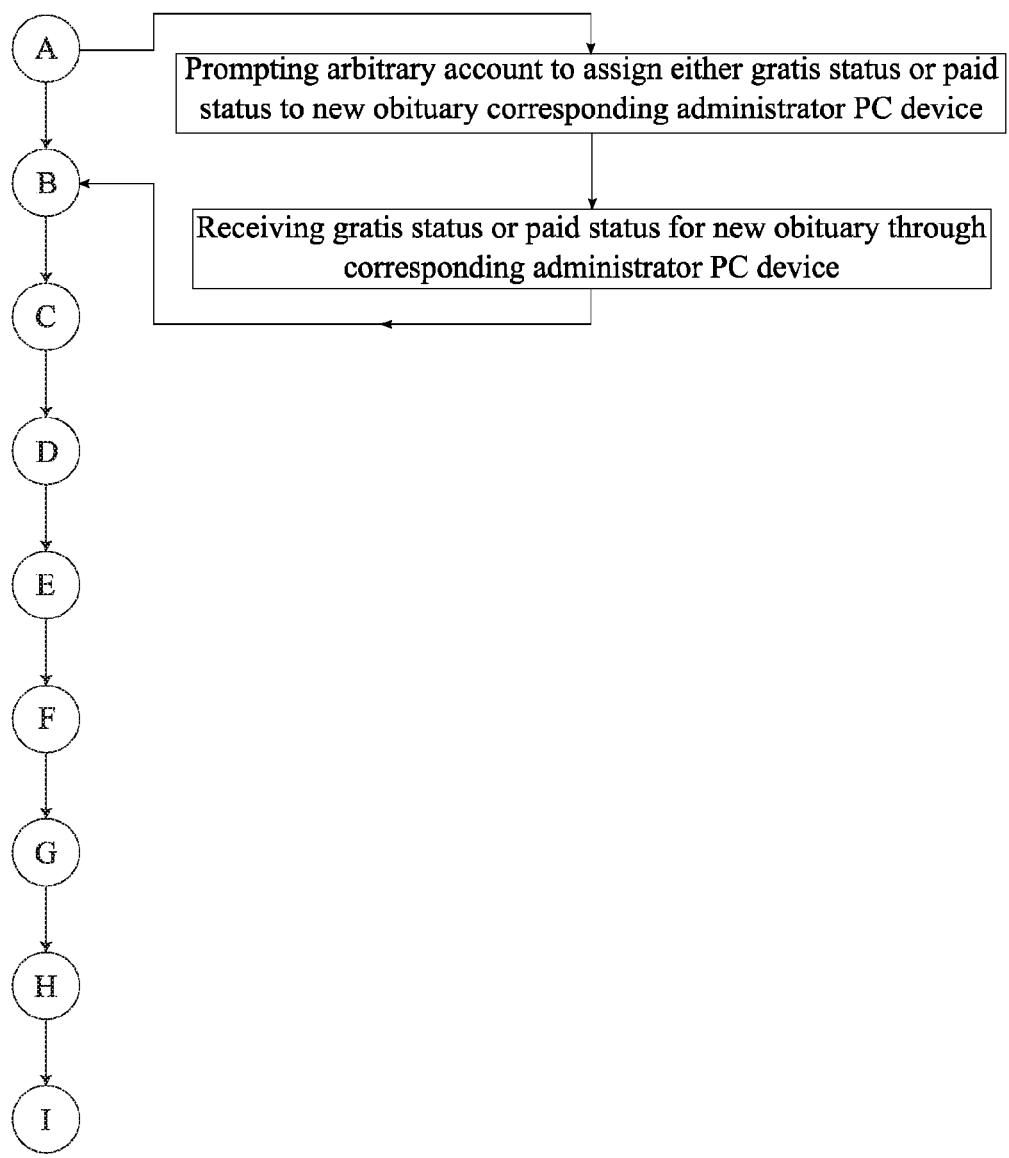
FIG. 4 is a flowchart depicting the steps necessary to assign a gratis status or a paid status to the new obituary.

Additionally, referring to FIG. 4, the arbitrary account is prompted to assign either a gratis status or a paid status to the new obituary with the corresponding administrator PC device. Next, the present invention receives the gratis status or the paid status for the new obituary through the corresponding administrator PC device and assigns the status to the new obituary. Because this is required for each new entry, each of the plurality of obituaries is associated with either the gratis status or the paid status. The status of each of the obituaries indicate if a regular package or a premium package was for the associated obituary. In the preferred embodiment individuals who wish to use the present invention to distribute and publish their obituary have two options, free or paid; the gratis status reflects the free option and the paid status reflects the paid option. More specifically, the free option includes displaying the new obituary only in the residence city of the deceased, much like how newspaper obituaries are set up currently. The paid status requires a nominal fee to be paid and includes the new obituary being displayed in the residence city of the deceased as well as any city and state listed in the new obituary and/or any specific named region. In general, the main difference between the free option and the paid option is the number of locations where the new obituary will be posted. Obituaries submitted by each of the administrator accounts are immediately stored. As a result, the user account(s) is able to view any obituary immediately, without having to wait for physical publishing as is most common with newspaper obituaries.

In order to display the correct obituaries to the user account the present invention utilizes the text of each of the obituaries to identify locations that are related to the corresponding obituary. More specifically, geospatial locations for each of the obituaries are identified by contextually parsing the biographical information for each of the obituaries. For example, if the obituary reads "Thomas Cannon Limbers, 85, of Grafton, W. Va. passed away Saturday, Mar. 21, 2015, at Russell Medical Center in Alexander City, Ala. He was born Dec. 5, 1929, son of the late Norah C.

Figure 5:
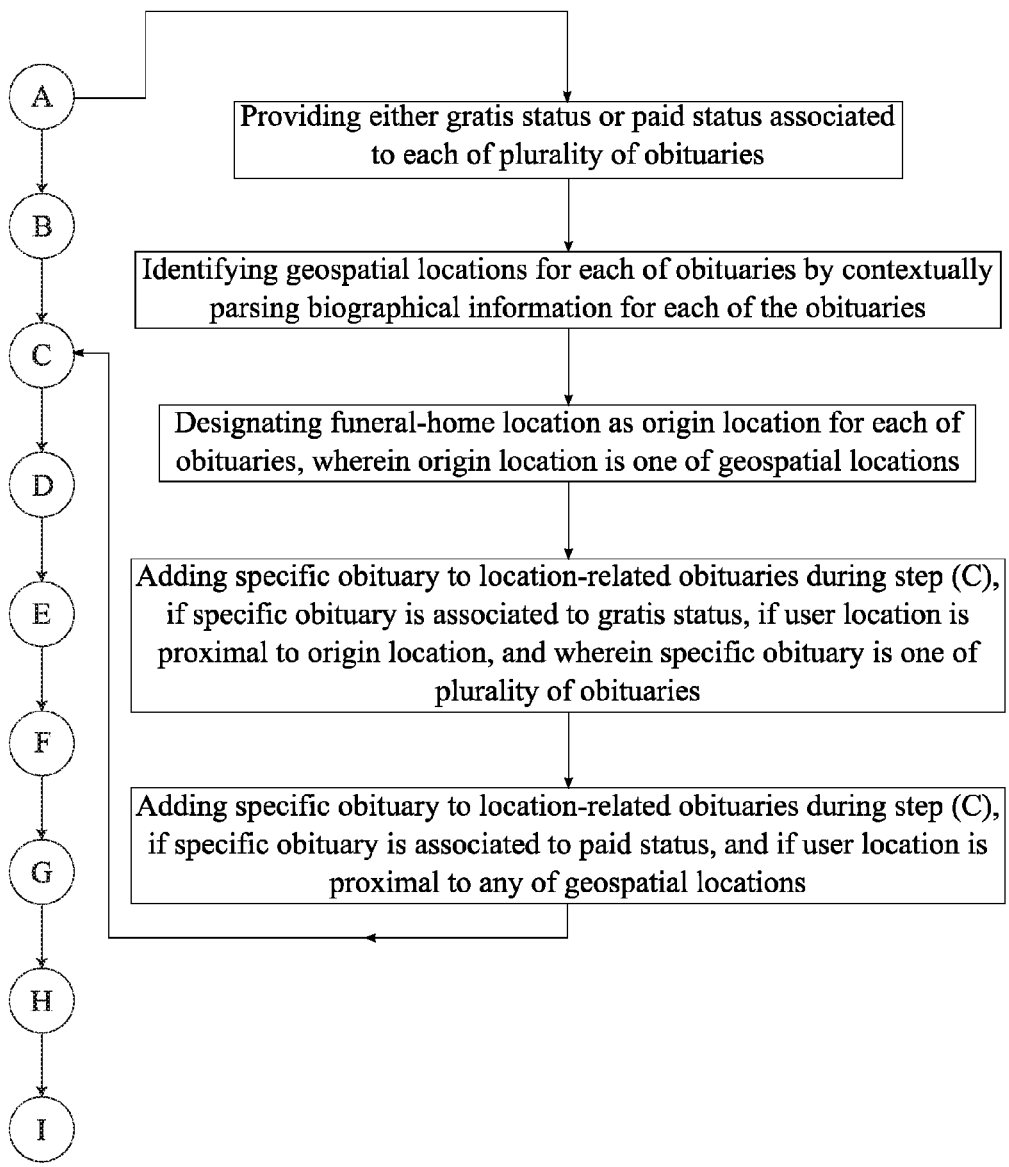
FIG. 5 is a flowchart depicting the steps necessary to identity location-related obituaries based on the gratis status and the paid status.

Limbers.", then the present invention will identify at least two locations, West Virginia and Alabama, as geospatial locations associated with said obituary. A variety of types of locations may be used for the geospatial locations including, but not limited to, zipcodes, cities, states, countries, counties, and any other similar types of locations. Additionally, it is necessary to designate the funeral-home location as an origin location for each of the obituaries, wherein the origin location is one of the geospatial locations. Referring to FIG. 5, during Step C a specific obituary from the plurality of obituaries is added to the location-related obituaries if the specific obituary is associated to the gratis status and if the user location is proximal to the origin location. In general, if the specific obituary was posted through a complimentary service, then the specific obituary is only displayed to the user account if the user location is near the origin location, very similar to newspapers where the audience that receives obituary information is within a certain distance of the funeral home. Additionally, the specific obituary is added to the location-related obituaries if the specific obituary is associated to the paid status and if the user location is proximal to any of the geospatial location. In general, if the specific obituary was posted through a paid service, the paid status, then the specific obituary is displayed to the user account if the user location is within a certain distance of any of the listed locations within the specific obituary.

Figure 8:
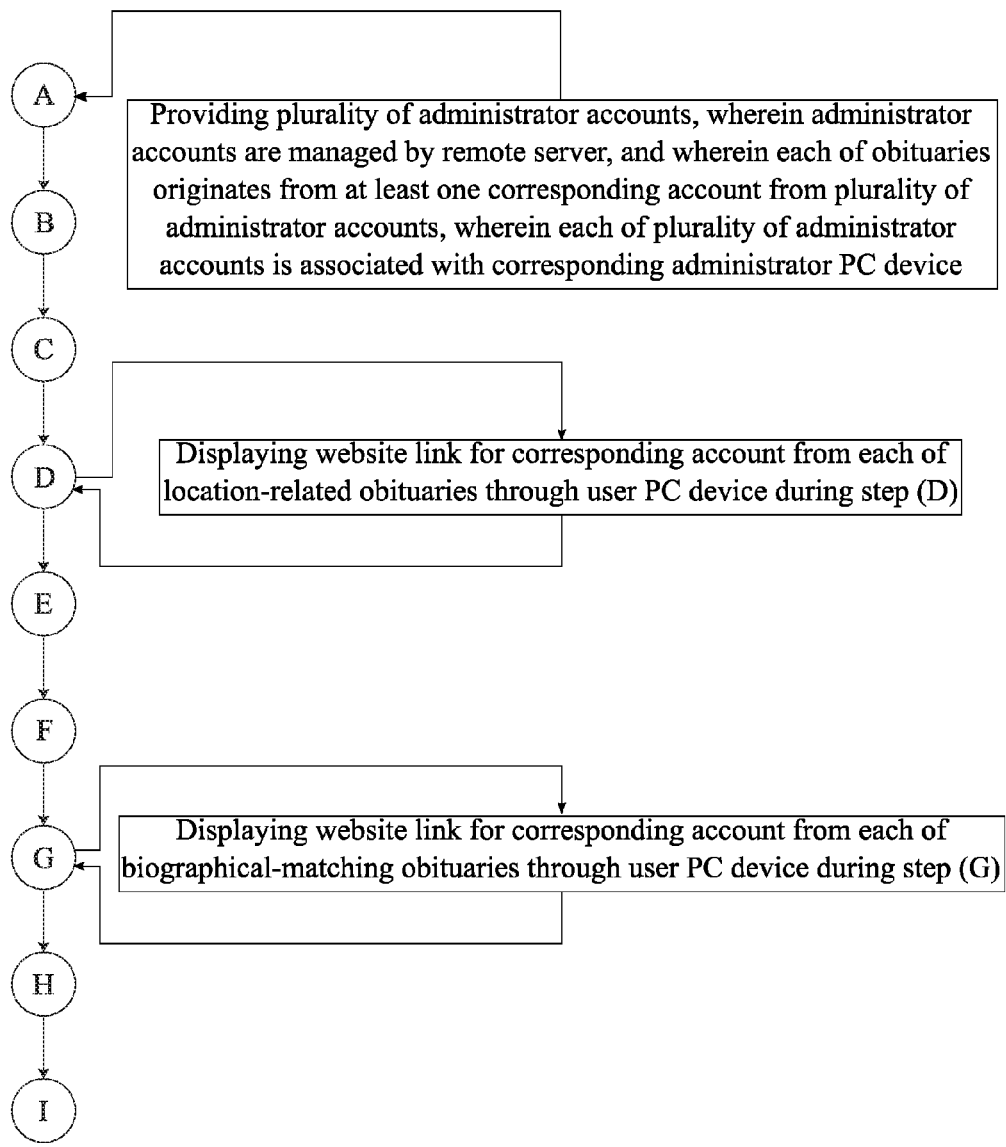
FIG. 8 is a flowchart depicting the steps necessary to display a website link for the corresponding account from each of the location-related obituaries and from each of the biographical-matching obituaries.

Referring to FIG. 8, the origin location is used to provide the user account with contact information of the funeral home where the obituary was submitted. More specifically, a website link for the corresponding account from each of the location-related obituaries is displayed through the user PC device during Step D. Similarly, the website link for the corresponding account from each of the biographical-matching obituaries is displayed through the user PC device during step G. This allows the user account to visit the funeral home for the obituary in order to obtain/view contact information.

Figure 7:
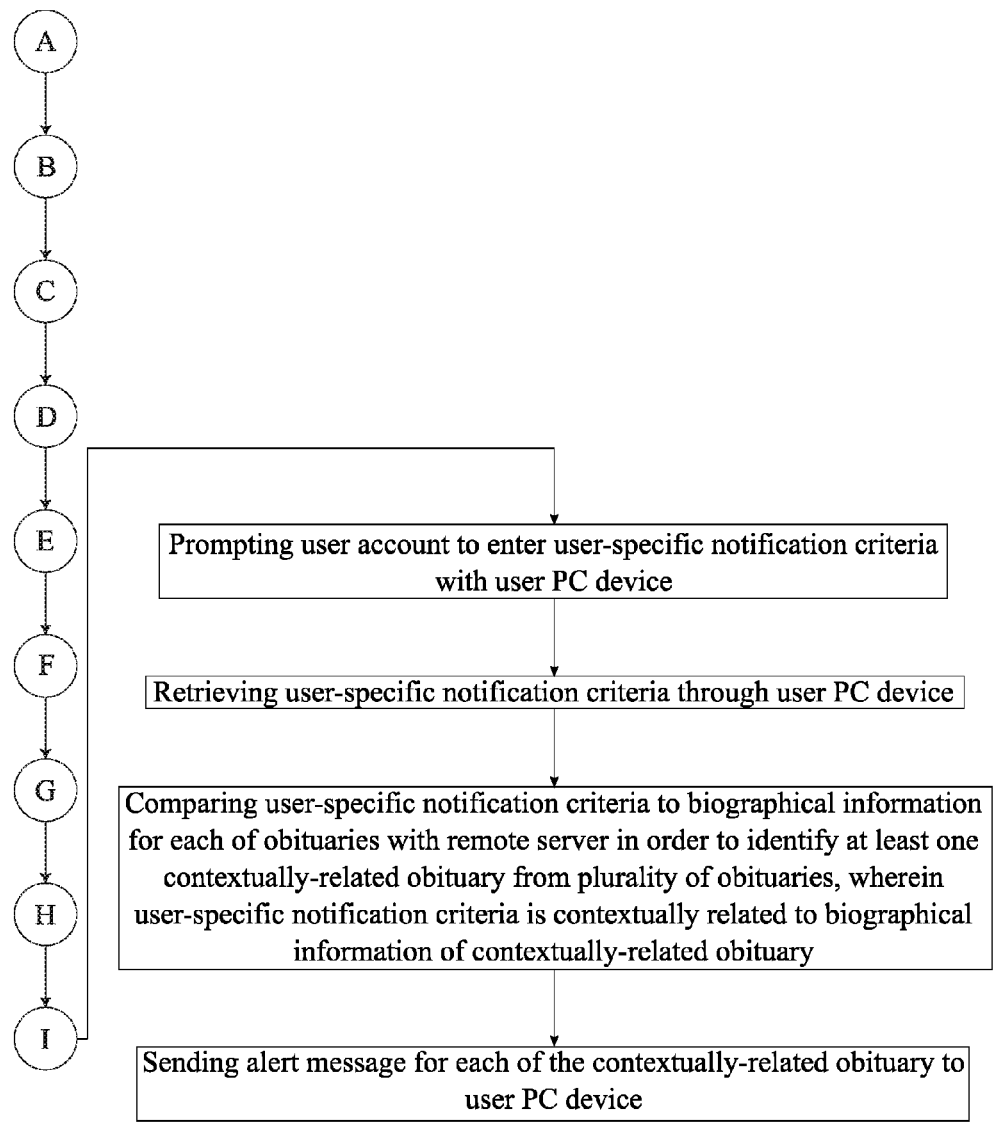
FIG. 7 is a flowchart depicting the steps necessary to provide the user account with alert message in response to an obituary meeting user-specific notification criteria.

Referring to FIG. 7, another aspect of the present invention is a notification feature. This feature allows the user account to receive instant notifications when one of the plurality of obituaries meets pre-defined preferences. Types of notifications include web notifications, e-mails, social media notifications, text messages, phone calls and standalone application notifications. In order to receive notifications, the user account is first prompted to enter user-specific notification criteria with the user PC device. Type of notification criteria include, but is not limited to, specific location, last name, and first name. Once entered, the user-specific notification criteria are retrieved through the user PC device. Then, the user-specific notification criteria are compared to the biographical information for each of the obituaries with the remote server in order to identify at least one contextually-related obituary from the plurality of obituaries; wherein the user-specific notification criteria is contextually related to the biographical information of the contextually-related obituary. In general, the biographical information of the contextually-related obituary mentions or contains information which matches or meets the user-specific criteria. Finally, an alert message for each of the contextually-related obituary is sent to the user PC device. The alert message includes the corresponding contextually-related obituary. In one embodiment of the present invention, the user account is able to link their social media account, such as Facebook, to the present invention for notifications.

Figure 6:
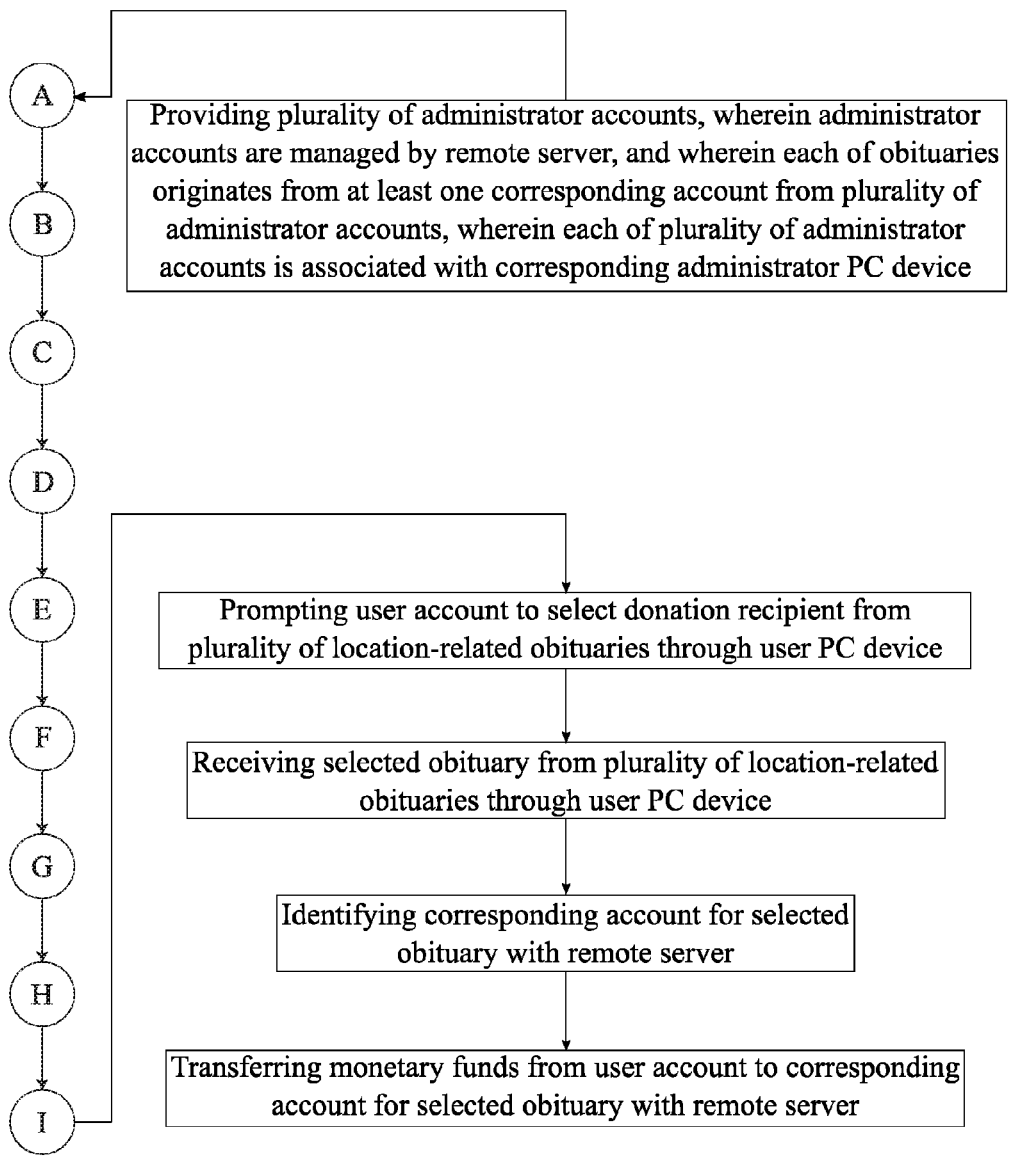
FIG. 6 is a flowchart depicting the steps necessary to allow the user account donate monetary funds to a selected obituary from the plurality of obituaries.

Referring to FIG. 6, another important feature of the present invention is a donation feature. More specifically, the user account is able to donate directly to family, funeral home, or a charity of a selected obituary. Current methods of donating involve a third party which are most often times cumbersome to deal with. Additionally, individuals do not know for sure if the donated money is going toward the funeral expenses or the chosen receiver. The donation feature allows individuals to donate directly to the funeral home to pay for expenses. Knowing that the donated money is going straight to the funeral home to cover the funeral related expenses may further incentivize individuals to donate. For this process, the user account is prompted to select a donation recipient from the plurality of location-related obituaries through the user PC device. Next, the remote server receives a selected obituary from the plurality of location-related obituaries through the user PC device. The corresponding account, funeral home, for the selected obituary is then identified with the remote server. Monetary funds are then transferred from the user account to the corresponding account for the selected obituary with the remote server. The amount and the medium used to transfer the money may vary depending on the preferences of the user account and the corresponding account. This feature allows the user to donate money in order to cover funeral costs for the grieving family directly. In another embodiment, the user account is able to donate to a charity selected by the grieving family.

The aforementioned process for the present invention is disclosed in relation to a single individual as the process is identical if it were executed for a multitude of individuals. In the preferred embodiment, the present invention is executed for a plurality of user accounts, wherein each of the user accounts is enabled to access the present invention through a corresponding user PC device. From the present invention perspective, any obituary with the gratis status is displayed to user accounts that are within a certain proximity of the origin location associated with said obituary. Alternatively, any obituary with the paid status is displayed to user accounts that are within a certain proximity of the origin location associated with said obituary and is posted to user accounts that are within the geospatial location associated with said obituary.

In one embodiment, the present invention enables each of the user accounts to search and view the plurality of obituaries by hosting a website, the user interface essentially. Additionally, the hosting website includes a multi-language features that allows each of the user accounts to view the information within the present invention in a variety of languages. This may be useful for military personnel as well as individuals living abroad. In an alternative embodiment, the present invention is implemented in the form of a software application for computers, smartphones, tablets, and other computing devices with Internet capabilities.

The key to successfully implementing the present invention requires funeral homes all across the country (and eventually the world) to participate. The aim is to keep the public informed of deaths with a single place for all obituaries posted in the country. Current methods of posting obituaries in newspapers is non-beneficial to funeral homes as they receive nothing. The flat fee charged by the present invention to post the obituary will be split between the governing entity of the present invention and funeral home (s). In the preferred embodiment of the present invention, a flat fee of $100 is be charged to post an obituary with $50 going toward the governing entity and $50 going toward the funeral home. Alternative systems and proportions may also be used.

In another embodiment, the present invention is used for birth notices. In this embodiment, the funeral home is replaced by a hospital. Rather than death notices being posted by funeral homes, birth notices are posted nurses or doctors. All other functions will remain the same. For example, nurses/doctors are provided with the ability to submit and modify birth notices. The plurality of user accounts is able to access the present invention in order to view the birth notices, set preferences for notifications, etc.

The present invention also may provide alternative methods for generating revenue. Advertisements may be posted at three distinct levels. The advertisements may be posted on the main page, local pages and the funeral home pages. The main page represents the national level, the local pages represents the local level and the funeral home pages represents the funeral home level. Each of the user account that first access the present invention will be presented with advertisements based on the national level. These advertisements may be from companies all around the country. Upon accessing the local pages, the advertisements will be based on local companies. In other words, the local pages will show advertisements for companies within the area, preferably based on zip code. Advertisements aimed toward the user accounts will be for funeral related services, such as lawyers, funeral homes, genealogy, etc.

Advertisements may also be available to the plurality of administrator accounts. These advertisements are geared toward funeral home directors. When funeral home directors post/update obituaries, they will see various advertisements relating to funeral home supplies, etc. Additionally, there may be a retail side of the invention. Currently, mass distribution websites are undercutting funeral related products. Funeral homes currently have a very difficult time competing with such companies due to their lower pricing and their inability to buy a mass quantity of products. The present invention essentially creates a co-op buying system for funeral homes. This will allow for funeral homes to conveniently form a group for negotiating power to allow them to get merchandise at the best price so that they are able to compete with internet companies.

Although the invention has been explained in relation to its preferred embodiment, it is to be understood that many other possible modifications and variations can be made without departing from the spirit and scope of the invention as hereinafter claimed.

What is claimed is:

1. A method for a centralized obituary service comprises the steps of:
   (A) providing an at least one user account, wherein the user account is managed by an at least one remote server and is associated with a user location;
   (B) providing a plurality of obituaries, wherein each of the obituaries is managed by the remote server and includes biographical information;
   (C) comparing the user location to the biographical information for each of the obituaries in order to identify location-related obituaries from the plurality of obituaries, wherein the user location is locationally related to the biographical information for each of the location-related obituaries;
   (D) displaying the location-related obituaries with a user personal computing (PC) device, wherein the user PC device is associated to the user account;
   (E) prompting the user account to enter a search query request through the user PC device, wherein the search query request includes a set of biographical criteria;
   (F) identifying a set of biographically-matching obituaries within the plurality of obituaries, if the user PC device receives the search query request from the user account, wherein the biographical information for each of the biographically-matching obituaries meets at least one criterion from the set of biographical criteria; and
   (G) displaying the set of biographically-matching obituaries with the user PC device;
   (H) providing a plurality of administrator accounts, wherein the administrator accounts are managed by the remote server, and wherein each of the obituaries originates from at least one corresponding account from the plurality of administrator accounts, wherein each of the plurality of administrator accounts is associated with a corresponding administrator PC device; and
   displaying a website link for the corresponding account from each of the biographical-matching obituaries through the user PC device during step (G).

2. The method for a centralized obituary service as claimed in claim 1 comprises the steps of:
   providing a plurality of administrator accounts, wherein the administrator accounts are managed by the remote server, and wherein each of the obituaries originates from at least one corresponding account from the plurality of administrator accounts, wherein each of the plurality of administrator accounts is associated with a corresponding administrator PC device;
   providing a funeral-home location for each of the administrator accounts;
   prompting each of the administrator accounts to create a new obituary through the corresponding administrator PC device;
   retrieving new biographical information from an arbitrary account from the plurality of administrator accounts through the corresponding administrator PC device, if the arbitrary account creates the new obituary;
   assigning the funeral-home location of the arbitrary account to the new obituary of the arbitrary account; and
   storing the new obituary of the arbitrary account as one of the plurality of obituaries by the remote server.

3. The method for a centralized obituary service as claimed in claim 2 comprises the steps of:
   prompting the arbitrary account to assign either a gratis status or a paid status to the new obituary with the corresponding administrator PC device; and
   receiving the gratis status or the paid status for the new obituary through the corresponding administrator PC device.

4. The method for a centralized obituary service as claimed in claim 1 comprises the steps of:
   providing either a gratis status or a paid status associated to each of the plurality of obituaries;
   identifying geospatial locations for each of the obituaries by contextually parsing the biographical information for each of the obituaries;
   designating a funeral-home location as an origin location for each of the obituaries, wherein the origin location is one of the geospatial locations;
   adding a specific obituary to the location-related obituaries during step (C),
   if the specific obituary is associated to the gratis status,
   if the user location is proximal to the origin location, and
   wherein the specific obituary is one of the plurality of obituaries; and
   adding the specific obituary to the location-related obituaries during step (C),
   if the specific obituary is associated to the paid status, and if the user location is proximal to any of the geospatial locations.

5. The method for a centralized obituary service as claimed in claim 1 comprises the steps of:
    providing a plurality of administrator accounts, wherein the administrator accounts are managed by the remote server, and wherein each of the obituaries originates from at least one corresponding account from the plurality of administrator accounts, wherein each of the plurality of administrator accounts is associated with a corresponding administrator PC device;
    prompting the user account to select a donation recipient from the plurality of location-related obituaries through the user PC device;
    receiving a selected obituary from the plurality of location-related obituaries through the user PC device;
    identifying the corresponding account for the selected obituary with the remote server; and
    transferring monetary funds from the user account to the corresponding account for the selected obituary with the remote server.

6. The method for a centralized obituary service as claimed in claim 1 comprises the steps of:
    prompting the user account to enter user-specific notification criteria with the user PC device;
    retrieving the user-specific notification criteria through the user PC device;
    comparing the user-specific notification criteria to the biographical information for each of the obituaries with the remote server in order to identify at least one contextually-related obituary from the plurality of obituaries, wherein the user-specific notification criteria is contextually related to the biographical information of the contextually-related obituary; and
    sending an alert message for each of the contextually-related obituary to the user PC device.

7. The method for a centralized obituary service as claimed in claim 1 comprises the steps of:
    providing a plurality of administrator accounts, wherein the administrator accounts are managed by the remote server, and wherein each of the obituaries originates from at least one corresponding account from the plurality of administrator accounts, wherein each of the plurality of administrator accounts is associated with a corresponding administrator PC device; and
    displaying a website link for the corresponding account from each of the location-related obituaries through the user PC device during step (D).

* * * * *